June 28, 1955 F. AMIOT 2,711,796
VARIABLE PITCH PROPELLER MECHANISM
Filed Feb. 21, 1951 4 Sheets-Sheet 1

INVENTOR
FÉLIX AMIOT
BY Bailey, Stephens and
Huettig
ATTORNEYS

June 28, 1955　　　F. AMIOT　　　2,711,796
VARIABLE PITCH PROPELLER MECHANISM
Filed Feb. 21, 1951　　　　　　　　4 Sheets-Sheet 2

INVENTOR
FÉLIX AMIOT
BY Bailey, Stephens and
Huettig
ATTORNEYS

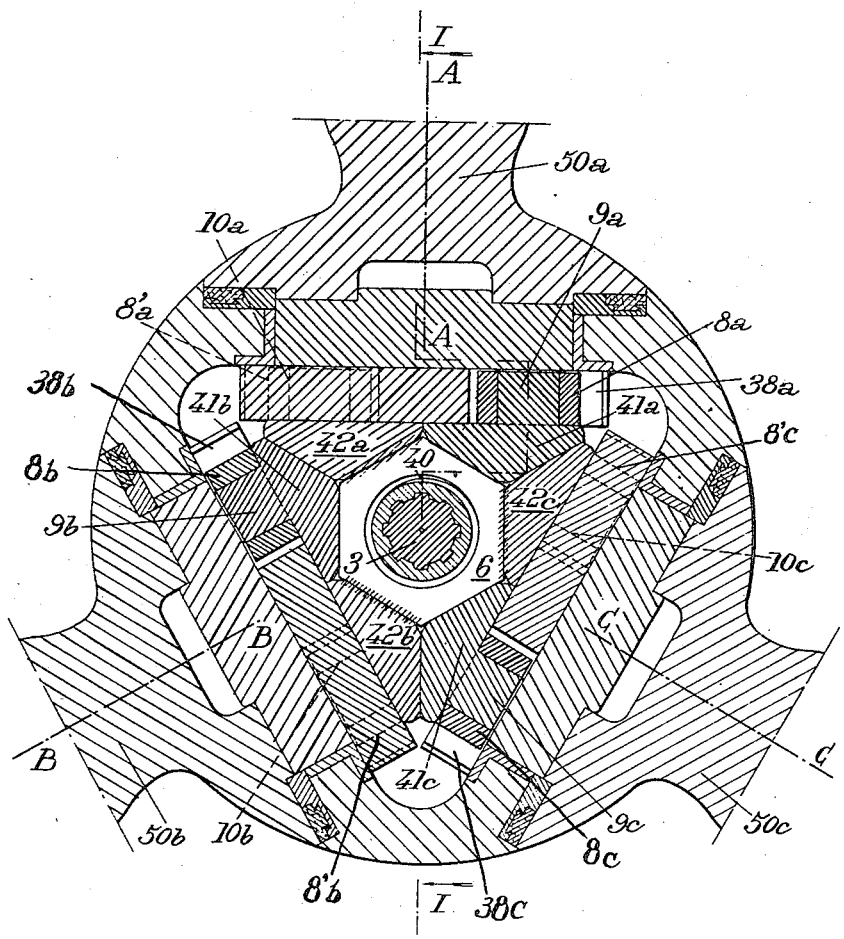

United States Patent Office 2,711,796
Patented June 28, 1955

2,711,796

VARIABLE PITCH PROPELLER MECHANISM

Félix Amiot, Neuilly-sur-Seine, France

Application February 21, 1951, Serial No. 212,123

Claims priority, application France February 23, 1950

5 Claims. (Cl. 170—160.29)

The present invention relates to variable pitch propeller mechanisms, especially for use on marine and other crafts.

The object of my invention is to provide a mechanism of this kind which is better adapted to meet the requirements of practice than those used up to this time, especially from the points of view of simplicity, safety and reliability.

Preferred embodiments of my invention will be hereinafter described with reference to the accompanying drawings, given merely by way of example and in which:

Fig. 4 is a view similar to Fig. 1, corresponding to another embodiment of my invention;

Fig. 5 is a sectional view on the line V—V of Fig. 4, this view corresponding to a pitch of the blades different from that shown on Fig. 4;

Figure 1:
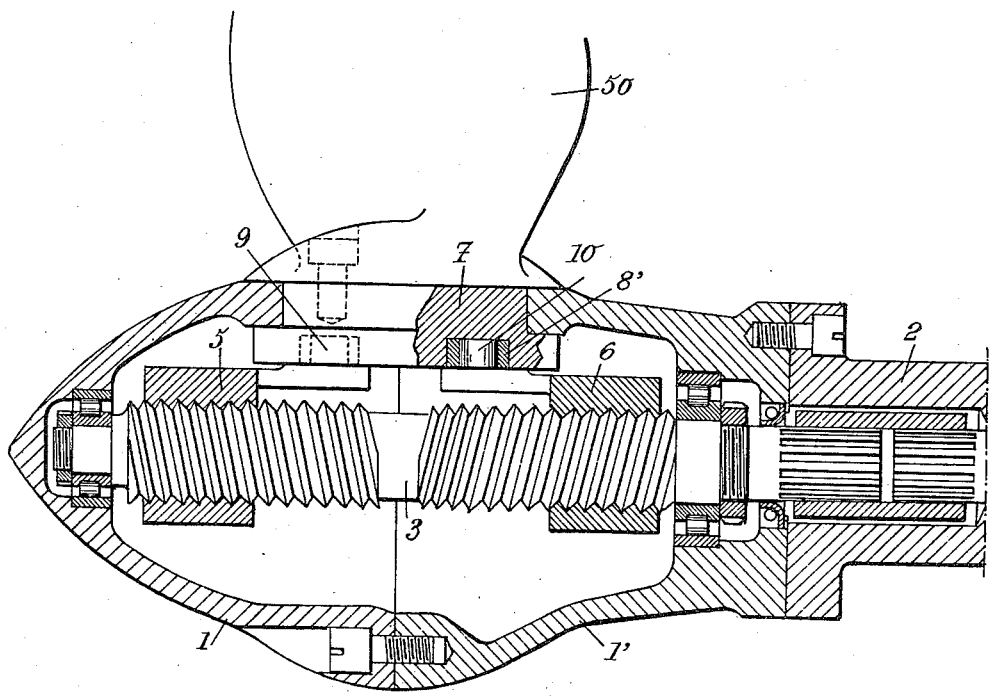
Fig. 1 is an axial sectional view of the hub of a variable pitch propeller according to my invention.
Figure 2:
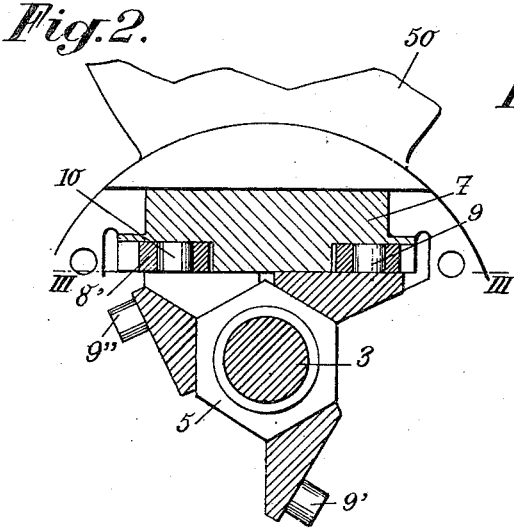
Fig. 2 is a corresponding end view, with parts cut away.
Figure 3:
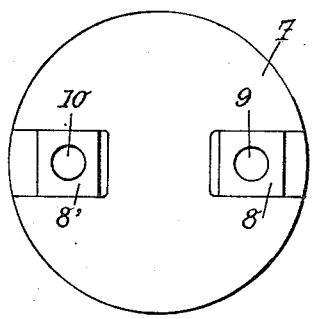
Fig. 3 is a part view in section on the line III—III of Fig. 2.
Figure 2:
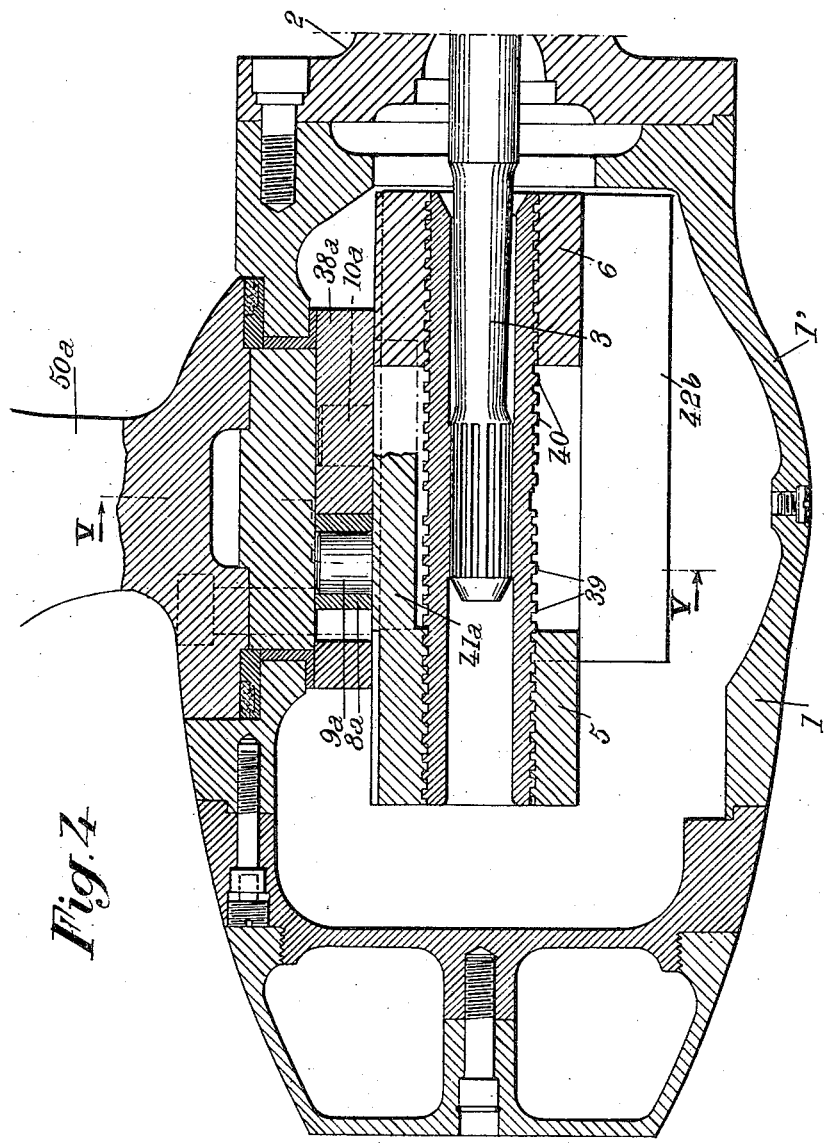

Referring first to the embodiment of Figs. 1 to 3, the propeller hub is constituted by a casing constituted by two portions 1 and 1' assembled together, for instance by means of screws, and rigid with the main propeller shaft 2, this hub carrying the propeller blades, one of which is shown at 50, which propeller blades are each rotatable with respect to the hub about a radial axis at right angles to shaft 2.

In this hollow hub 1—1' is journalled, at both ends thereof, a coaxial shaft 3 provided with right and left screw-threaded sections of the same pitch. Engaged on these two threaded sections are two nuts 5 and 6 mounted to slide in the direction of the shaft axis but prevented from rotating about this axis, as it will be hereinafter explained. These nuts carry, rigid therewith, projections extending in the direction of the shaft axis and provided with pins such as 9, 10 engaged in sliding pieces 8, 8' slidable in grooves provided in the root portion 7 of the corresponding blade 50.

The propeller is supposed to have three blades. Accordingly, each nut carries three pins, for instance 9, 9', 9'' for nut 5, each of said pins cooperating with the root portion of one of the propeller blades respectively.

It will be readily understood that the positions of nuts 5 and 6 on shaft 3 determine the pitch of the three blades. As long as shaft 3 rotates at the same speed as shaft 1, the pitch remains unchanged. On the contrary, as soon as a relative rotation of shafts 1 and 3 with respect to each other is caused to occur, pins 9 and 10 exert on the corresponding blade 50 opposed and symmetrical actions which rotate said blade about its axis, thus producing a variation of the pitch thereof. Similar actions are synchronously exerted by pins 9' and 10' on the one hand and 9'' and 10'' on the other hand on the two other propeller blades.

My device includes means, operative by the propeller drive for producing, when so desired, a relative rotation of shafts 1 and 3 with respect to each other, said means being adapted normally to keep both of these shafts rotating at the same speed. An embodiment of such means will be hereinafter described in detail.

The preferred embodiment of Figs. 4 and 5 is of the same general structure as that of Figs. 1 and 2. However, as some corresponding elements differ in their structure or relation with respect to one another, new reference characters have been used to designate them.

The three propeller blades are 50a, 50b and 50c. Their respective bases or roots 38a, 38b and 38c are pivoted on the hub casing about axes A—A, B—B and C—C respectively.

Shaft 3 carries, coaxially fixed thereon, a sleeve provided with two respectively right and left threaded sections 39 and 40.

Nuts 5 and 6 are engaged on these threaded portions 39 and 40, respectively.

The pins 9a, 9b, 9c (called 9, 9', 9'' in the embodiments of Figs. 1–2) carried by nut 5 and 10a, 10b, 10c (called 10, 10' and 10'' in said first embodiment) carried by nut 6 are formed on arms 41a, 41b, 41c and 42a, 42b, 42c, respectively, extending in directions parallel to the common axis of shafts 2 and 3.

The sliding pieces, slidable in the blade bases 38a, 38b and 38c, in which these pins engage are designated by reference characters 8a, 8b, 8c and 8'a, 8'b, 8'c.

It will be readily understood that, with such an arrangement, the inner faces of blade bases or roots 38a, 38b, 38c limit a prismatic space of equilateral triangular cross section.

According to my invention, the six arms 41a, 41b, 41c, 42a, 42b, 42c are arranged so as slidably to engage one another and also slidably to engage the inner faces of bases 38a, 38b, 38c.

This result is obtained by giving the cross sections of said arms a triangular shape as shown by Fig. 5. It should also be well understood that the arms carried by one of the nuts have their ends bearing upon the corresponding faces of the other nut even when said nuts are at the maximum distance from each other.

With such an arrangement, the whole of the six arms in question forms a kind of telescopic prismatic block of triangular cross section fitting in the prismatic space limited by the inner faces of bases 38a, 38b and 38c, whereby nut 5 is well supported in the hollow hub casing and constitutes a bearing for shaft 3.

The bearing provided at the left hand end of the hub for said shaft in the embodiment of Fig. 1 therefore becomes superfluous and is dispensed with.

Figure 6:
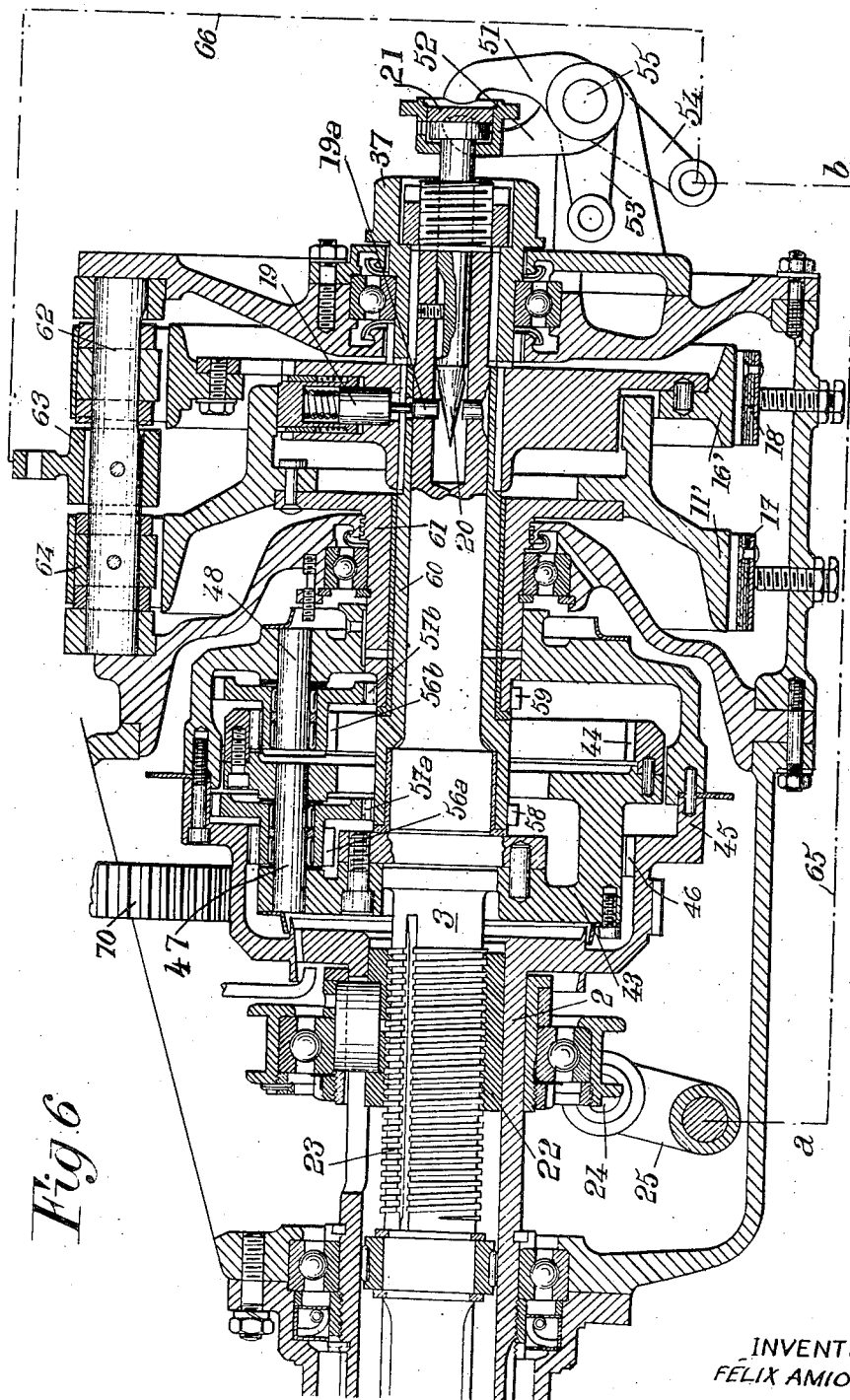
Fig. 6 is a longitudinal sectional view of the gear system for controlling the pitch variations.

Fig. 6 shows a gear system for obtaining at will the desired temporary difference between the speeds of shafts 2 and 3 in order to vary the pitch of the propeller.

The inner shaft 3 is rigid with a cage 43 coaxial therewith and provided with a circular row of inward teeth 44 which constitute a first sun wheel.

The propeller shaft proper 2 is rigid with a cage 45 coaxial therewith and provided with a circular row of inward teeth 46 which constitute a second sun wheel.

On the other hand, cage 43 carries a plurality of pivot axes 47 (only one of which is visible) on each of which are freely pivoted two planet wheels 56a and 57a, of different diameters, rigid with each other, planet wheel 56a meshing with sun wheel 46.

Similarly, cage 45 carries a plurality of pivot axes 48 (only one of which is visible) on each of which are freely pivoted two planet wheels 56b and 57b, of different diameters, rigid with each other, planet wheel 56b meshing with sun wheel 44.

Planet wheel 57a is in mesh with a sun wheel 58 rigid with a sleeve 60 coaxial with shaft 3 and freely rotatable thereon.

Planet wheel 57b is in mesh with a sun wheel 59 rigid with a sleeve 61 coaxially surrounding sleeve 60 and freely rotatable thereon.

In the example shown, the number of teeth of each of sun wheels 44 and 46 is 84. The number of teeth of each of planet wheels 57a and 57b is 34. The number of teeth of each of planet wheels 56a and 56b is 17. The number of teeth of each of sun wheels 58 and 59 is 33.

Sleeve 60 is rigid with a drum 16' adapted to be stopped by a brake 18.

Sleeve 61 is rigid with a drum 11' adapted to be stopped by a brake 17.

This gear system works in the following manner:

As it results from Figs. 4 and 5, the pitch of the propeller blades is increased when shaft 3 is slowed down with respect to the propeller shaft proper 2, whereas the pitch is reduced when shaft 3 is accelerated with respect to shaft 2.

In order to increase the pitch, brake 18 is applied to stop drum 16'. This stops sun wheel 58, and causes planet wheels 56a and 57a to rotate about axis 47, which results in slowing down shaft 3 with respect to shaft 2.

It is pointed out that, owing the speed reducing properties of the gear means thus brought into play, the reduction in the speed of revolution of shaft 3 is rather small as compared with the speed of revolution of shaft 2, which is supposed to run at uniform speed. In other words, if, for instance, shaft 2 is running at 100 revolutions per minute, the number of revolutions per minute of shaft 3 when drum 16' is stopped will be 85. Consequently, the pitch variation will take place at a relatively low rate, so that the operator will be able to release brake 18 just when the desired pitch has been obtained (the pitch variations being shown by an indicator as it will be hereinafter described). On the other hand, as the parts set in movement during the pitch variation have but a low inertia, all the elements will remain adjusted as they are just when brake 18 is released.

If, now, it is desired to reduce the pitch, drum 11' is stopped by means of brake 17. This stops sleeve 61 and sun wheel 59, and sets planet wheels 56b and 57 in rotation about their common axis 48, which increases the speed of revolution of shaft 3 with respect to that of shaft 2.

This increase also is small as compared with the speed of shaft 2 (115 revolutions per minute for shaft 3 when shaft 2 is running at 100 revolutions per minute). The advantage is the same as for pitch increase.

Means are provided for directly interconnecting drums 11' and 16' so as to cause them to rotate exactly at the same speed, which is then the speed of the two shafts 2 and 3. These means include radial pistons 19, slidable in cylindrical housings of drum 16' and rigid with radially expanding means 19a movable radially with respect to shaft 3. These pistons 19, when pushed outwardly, are adapted to bear against a cylindrical flange carried by drum 11' so as to interconnect both of the drums. Pistons 19 are adapted to be driven outwardly through expanding means 19a by a wedge 20 mounted axially in shaft 3 and adjustable by means of an external head 21, movable in opposite directions by levers 51 and 52 pivoted at 55 and both rigid with a hand lever 53.

The indicator means above referred to may be controlled by a nut 22 screwed on a threaded portion 23 of shaft 3 and guided longitudinally with respect to shaft 2, the longitudinal movements of this nut being transmitted through a ring 24 journalled on said nut 22, a fork (not visible) engaged on said ring, and a lever 25 to any suitable indicating means. It is pointed out that the movements of this nut are the same as those of nuts 5 and 6.

Brakes 17 and 18 are constituted by flexible metal bands passing around drums 11' and 16' and cams 64 and 62 respectively. Cams 64 and 62 are fixed on a common shaft in which is also fixed a sleeve 63 rigid with a control lever. Cam 64 is shaped so that rotation thereof in one direction applies band 17 against drum 11' and cam 62 is so shaped that rotation thereof in the opposed direction applies band 18 against drum 16'. Thus rotation of the control lever carried by sleeve 63 in one direction brakes drum 11' and in the other direction it brakes drum 16'.

In order to make it possible to vary the pitch when shaft 2 is not running, a nut 37 is fixed on the end of shaft 3, where it can be operated manually.

Propeller shaft 2 is driven by a pinion 70 connected with the engine and in mesh with teeth carried by casing 45.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A variable pitch propeller mechanism which comprises, in combination, a hollow hub, a main shaft rigid with said hub, propeller blades having their base portions rotatably mounted in said hub about respective axes at least substantially perpendicular to the axis of said shaft, the inner faces of said propeller blade base portions being flat and forming the faces of a prismatic space having its edges parallel to said axis, an auxiliary shaft extending in said hub coaxially with said main shaft, said auxiliary shaft being provided with right and left threaded portions, two nuts respectively engaged on said threaded portions of said auxiliary shaft, a plurality of arms parallel to said axis rigid with said two nuts, each nut carrying one arm for every propeller blade, said arms being in the form of prisms having their edges parallel to said axis and their outer faces flat and in sliding contact without material play with said flat inner faces of said propeller blade base portions respectively, each of said arms carried by one nut having two other flat faces in sliding contact without material play with corresponding faces of two arms carried by the other nut so that the arms rigid with one nut fit slidably between the arms rigid with the other nut even when said nuts are at the maximum distance from each other, cooperating pin and slot means carried by said arms and said blade base portions respectively for connecting every blade portion with two arms carried by said two nuts respectively, whereby said blade base portions are pivoted with respect to said hub in response to every relative axial displacement of said nuts caused by a relative rotation of said shafts, gear means between said two shafts for transmitting to said auxiliary shaft the motion of said main shaft, and means for varying the relative angular position of said shafts with respect to each other to vary the pitch of said propeller blades.

2. A mechanism according to claim 1 in which said gear means comprise two sun and planet wheel devices each including at least two planet wheels of different diameters coaxial with each other and disposed in tandem-like relation, an outer sun wheel in mesh with the smaller of said planet wheels and an inner sun wheel in mesh with the other planet wheel, a cage rigid with one of said shafts carrying the outer sun wheel of the first of said devices, at least one pivot spindle carried by said cage for supporting the planet wheels of the second device freely rotatable on said spindle, a cage rigid with the other shaft carrying the outer sun wheel of the second device, at least one pivot spindle carried by said second mentioned cage for supporting the planet wheels of the first device freely rotatable on said second mentioned spindle, two sleeves coaxial with said shafts and freely rotatable with respect thereto, said sleeves carrying the inner sun-wheels of said devices, respectively, and means for braking at will either of said sleeves.

3. A device according to claim 2 further including clutch means for directly coupling said two sleeves in rotation.

4. A device according to claim 1 further including manual means for rotating said auxiliary shaft with respect to said main shaft.

5. A variable pitch propeller mechanism which comprises, in combination, a hollow hub, a main shaft rigid with said hub, propeller blades having their base portions rotatably mounted in said hub about respective axes at least substantially perpendicular to the axis of said shaft, the inner faces of said propeller blade base portions being flat and forming the faces of a prismatic space having its edges parallel to said axis, an auxiliary shaft extending in said hub coaxially with said main shaft, said auxiliary shaft being provided with right and left threaded portions, two nuts respectively engaged on said threaded portions of said auxiliary shaft, a plurality of arms parallel to said axis rigid with said two nuts, each nut carrying one arm for every propeller blade, said arms being in the form of prisms having their edges parallel to said axis and their outer faces flat and in sliding fit with said flat inner faces of said propeller blade base portions respectively, each of said arms carried by one nut having two other flat faces in sliding fit with corresponding faces of two arms carried by the other nut so that the arms rigid with one nut fit slidably between the arms rigid with the other nut and form together a telescopic unit mating in said prismatic space even when said nuts are at the maximum distance from each other, cooperating pin and slot means carried by said arms and said blade base portions respectively for connecting every blade portion with two arms carried by said two nuts respectively, whereby said blade base portions are pivoted with respect to said hub in response to every relative axial displacement of said nuts caused by a relative rotation of said shafts, gear means between said two shafts for transmitting to said auxiliary shaft the motion of said main shaft, and means for varying the relative angular position of said shafts with respect to each other to vary the pitch of said propeller blades.

References Cited in the file of this patent

UNITED STATES PATENTS

| | | |
|---|---|---|
| 1,879,659 | Coolidge | Sept. 27, 1932 |
| 2,187,754 | Ruths et al. | Jan. 23, 1940 |
| 2,386,587 | Briner | Oct. 9, 1945 |
| 2,531,032 | Desmoulins | Nov. 21, 1950 |
| 2,543,453 | Fuller | Feb. 27, 1951 |
| 2,620,040 | Nichols | Dec. 2, 1952 |

FOREIGN PATENTS

| | | |
|---|---|---|
| 12,595 | Great Britain | of 1908 |